(12) United States Patent
Lee (10) Patent No.: US 6,488,261 B1
(45) Date of Patent: Dec. 3, 2002

(54) BALL VALVE

(76) Inventor: Jen-Chieh Lee, 47-2 Ju-Yi Rd., Hsi-Chi Li, Ta Chia Township, Taichung Hsien (TW)

( * ) Notice: Subject to any disclaimer, the term of this patent is extended or adjusted under 35 U.S.C. 154(b) by 0 days.

(21) Appl. No.: 10/096,026

(22) Filed: Mar. 11, 2002

Related U.S. Application Data (63) Continuation-in-part of application No. 09/789,307, filed on Feb. 21, 2001.

(51) Int. Cl.[7] .................................................. F16K 5/06
(52) U.S. Cl. .................. 251/174; 251/310; 251/315.11; 251/180
(58) Field of Search ............... 251/174, 315.1, 251/315.11, 315.12, 315.14, 180, 310, 311

(56) References Cited

U.S. PATENT DOCUMENTS

| | | | | |
|---|---|---|---|---|
| 2,558,260 A | * | 6/1951 | Maky | 251/310 |
| 3,228,652 A | * | 1/1966 | Antrim | 251/174 |
| 3,266,769 A | * | 8/1966 | Shand | 251/315.1 |
| 3,387,815 A | * | 6/1968 | Richards | 251/174 |
| 3,838,844 A | * | 10/1974 | Arn | 251/174 |
| 4,428,561 A | * | 1/1984 | Thompson | 251/174 |
| 4,718,444 A | * | 1/1988 | Boelte | 251/315.12 |
| 4,809,949 A | * | 3/1989 | Rakieski | 251/310 |
| 5,562,116 A | * | 10/1996 | Henwood | 251/315.14 |

* cited by examiner

*Primary Examiner*—Henry C. Yuen
*Assistant Examiner*—John Bastianelli
(74) *Attorney, Agent, or Firm*—Harrison & Egbert (57) ABSTRACT

A ball valve includes a valve body, a cap, a disk spring, a driven member, and a spherical body. The disk spring and the driven member are disposed in the cap such that the driven member is urged by the disk spring to displace, thereby causing the driven member to push PTFE washers to come in contact with the spherical body.

2 Claims, 9 Drawing Sheets

BALL VALVE

RELATED U.S. APPLICATIONS

The present invention is a continuation-in-part of co-pending application, U.S. Ser. No. 09/789,307, filed on Feb. 21, 2001, entitled "IMPROVEMENT ON A BALL VALVE".

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a valve, and more particularly to a ball valve.

BACKGROUND OF THE INVENTION

Figure 1:
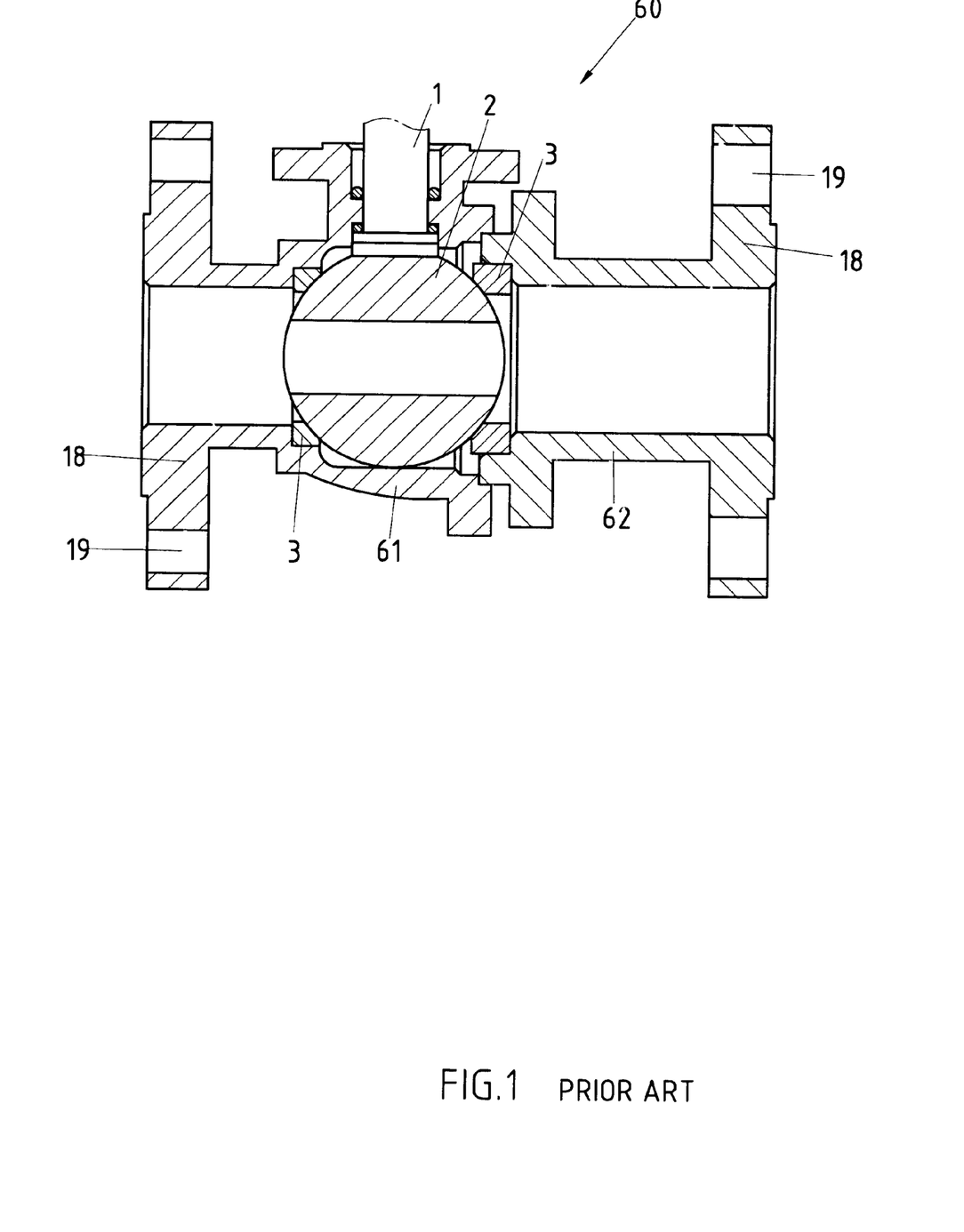
FIG. 1 shows a sectional view of a prior art ball valve.

As shown in FIG. 1, a prior art ball valve 60 includes a main body 61 and an auxiliary body 62. The main body 61 is provided in the interior with a rotary shaft 1, a spherical body 2, and two washers 3. The prior art ball valve 60 is defective in design because the auxiliary body 62 and the main body 61 must be separated to facilitate the repairing or maintaining of the ball valve 60. The separation of the auxiliary body 62 from the main body 61 is a time-consuming chore. In addition, the washers 3 are susceptible to wear and deformation due to the mechanical friction between the washers 3 and the spherical body 2. The wear or deformation of the washers 3 can result in leakage of the prior art ball valve 60.

BRIEF SUMMARY OF THE INVENTION

The primary objective of the present invention is to provide a ball valve which is free of the deficiencies of the prior art ball valve described above.

In keeping with the principle of the present invention, the foregoing objective of the present invention is achieved by a ball valve comprising a main body, a cap, a disk spring, a driven member, and a spherical body. The disk spring and the driven member are disposed in the cap such that the driven member is urged by the disk spring to displace, thereby causing two PTFE washers to come in contact with the spherical body.

The features and the advantages of the present invention will be more readily understood upon a thoughtful deliberation of the following detailed description of the present invention with reference to the accompanying drawings.

DETAILED DESCRIPTION OF THE INVENTION

As shown in FIGS. 2–11, a ball valve 10 of the present invention comprises a valve body 20, a cap 30, a disk spring 40, a driven member 41, and a spherical body 12.

Figure 2:
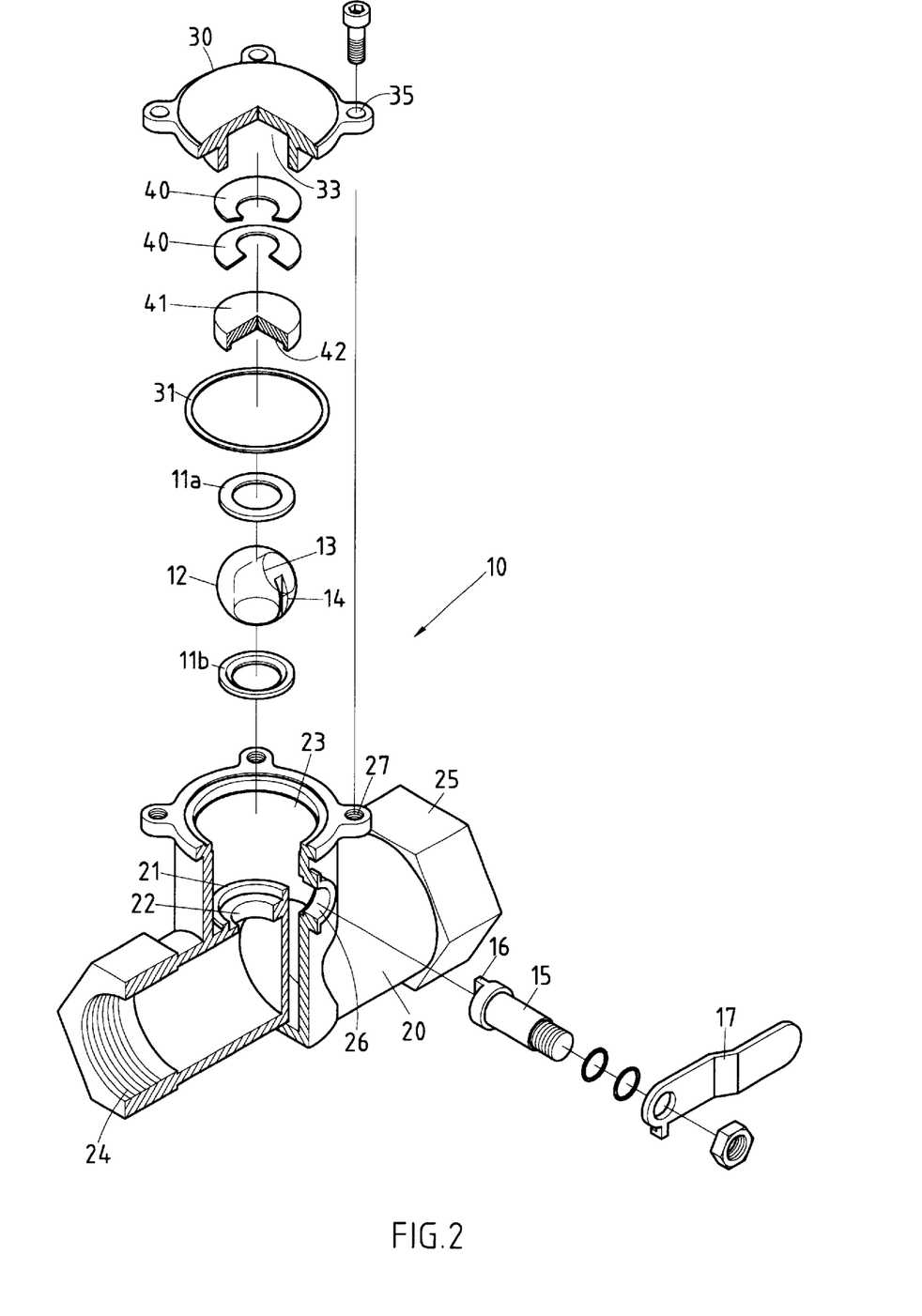
FIG. 2 shows an exploded view of the present invention.
Figure 3:
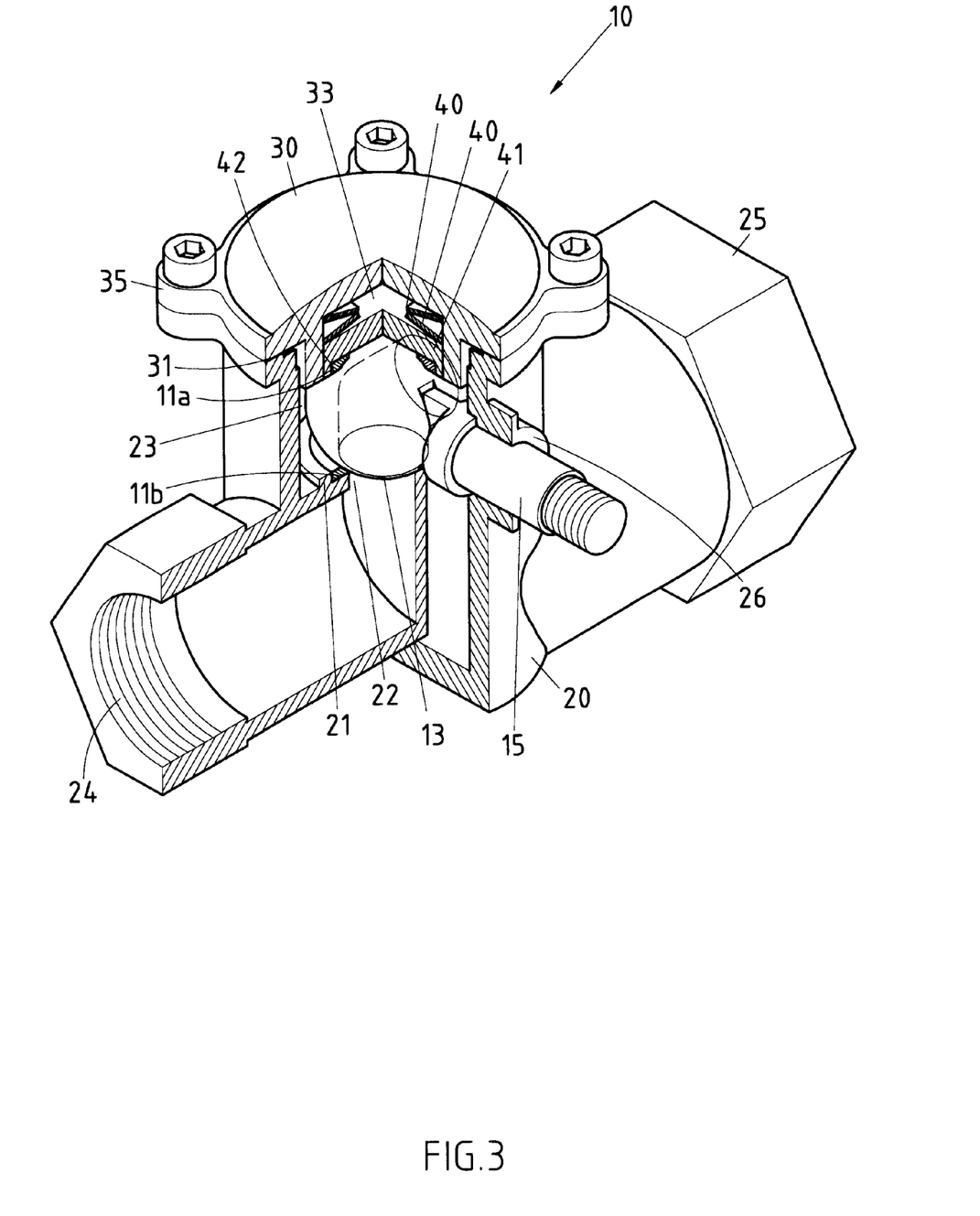
FIG. 3 shows a sectional view of the present invention.
Figure 4:
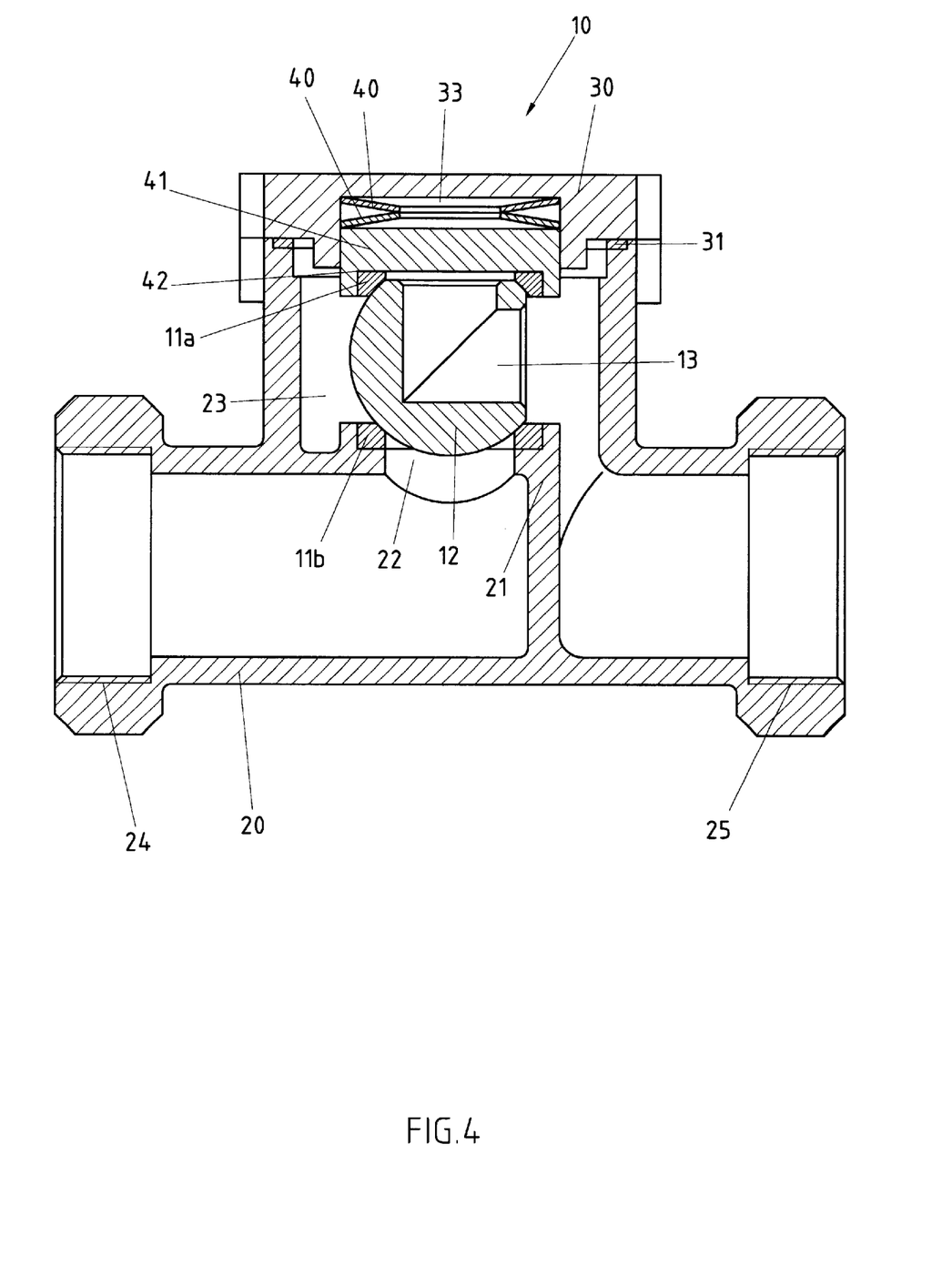
FIG. 4 shows another sectional view of the present invention.

The valve body 20 has a hollow interior which is divided by annular rib 21 into an annular seat 22 and a chamber 23. The valve body 20 is provided at one end with a first threaded pipe 24 extending therefrom such that the threaded pipe 24 is in communication with the annular seat 22 via the chamber 23. The valve body 20 is provided at other end with a second threaded pipe 25 in communication with the chamber 23. The valve body 20 is further provided with a shaft tube 26 in communication with the chamber 23, a rotary shaft 15 pivoted to the shaft tube 26, and a plurality of lugs 27.

The cap 30 is joined with the chamber 23 in conjunction with a seal ring 31 and is provided with a receiving portion 33 corresponding in location to the annular seat 22, and a plurality of lugs 35 corresponding in number and location to the lugs 27.

The disk spring 40 is disposed in the receiving portion 33 of the cap 30.

The driven member 41 is disposed in the receiving portion 33 of the cap 30 and is provided with an annular clamp seat 42.

The spherical body 12 is provided with an L-shaped channel 13 and is disposed between a first PTFE washer 11a which is held in the annular clamp seat 42, and a second PTFE washer 11b which is held in the annular seat 22. The spherical body 12 is provided in the outer surface with a retaining slot 14 for retaining a protrusion 16 of the rotary shaft 15. The rotary shaft 15 has a lever 17.

The driven member 41 is urged by the disk spring 40 to displace, thereby causing the first PTFE washer 11a to come in contact with the spherical body 12.

Figure 5:
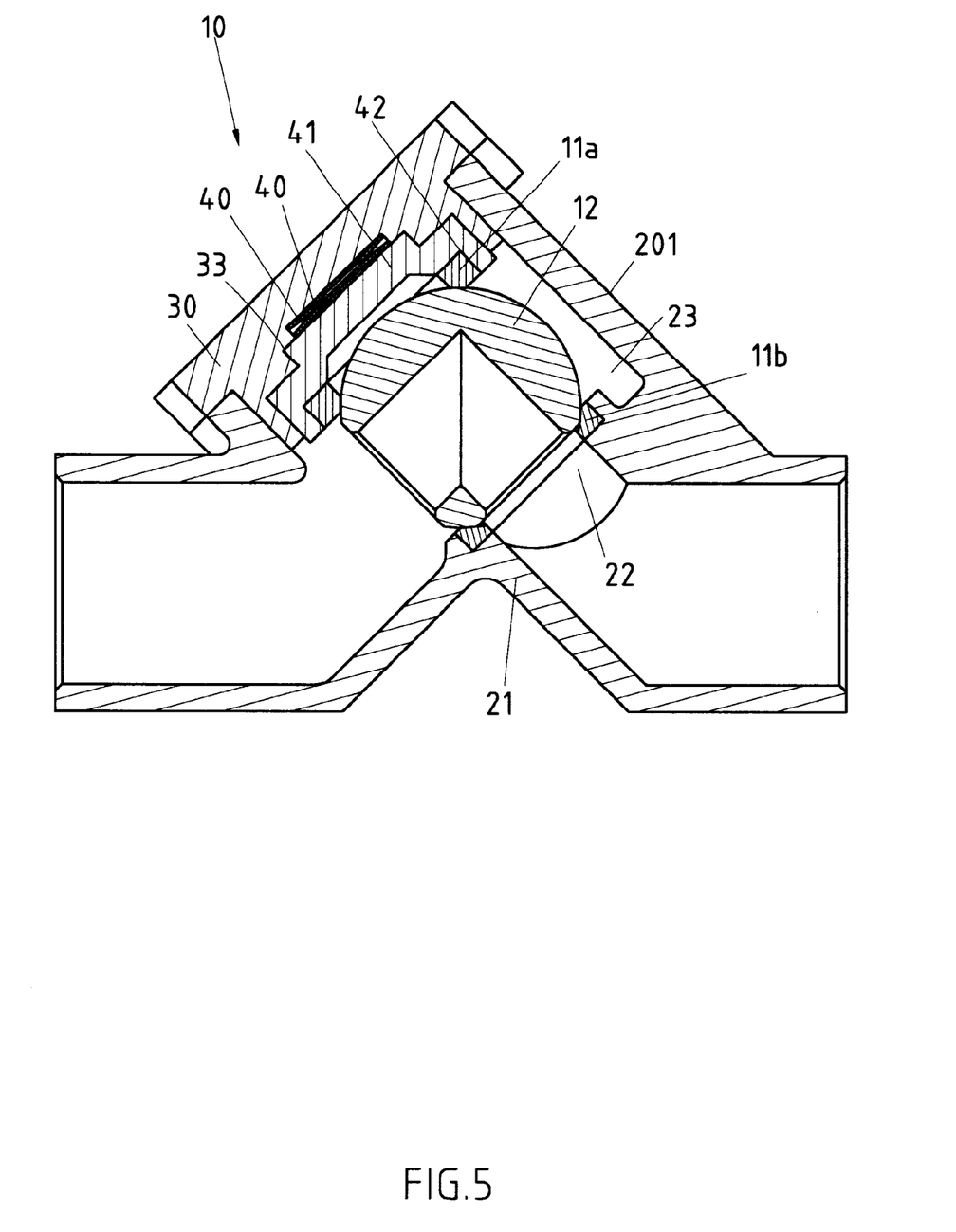
FIG. 5 shows a sectional view of the present invention with a spherical body having a Y-shaped channel.
Figure 6:
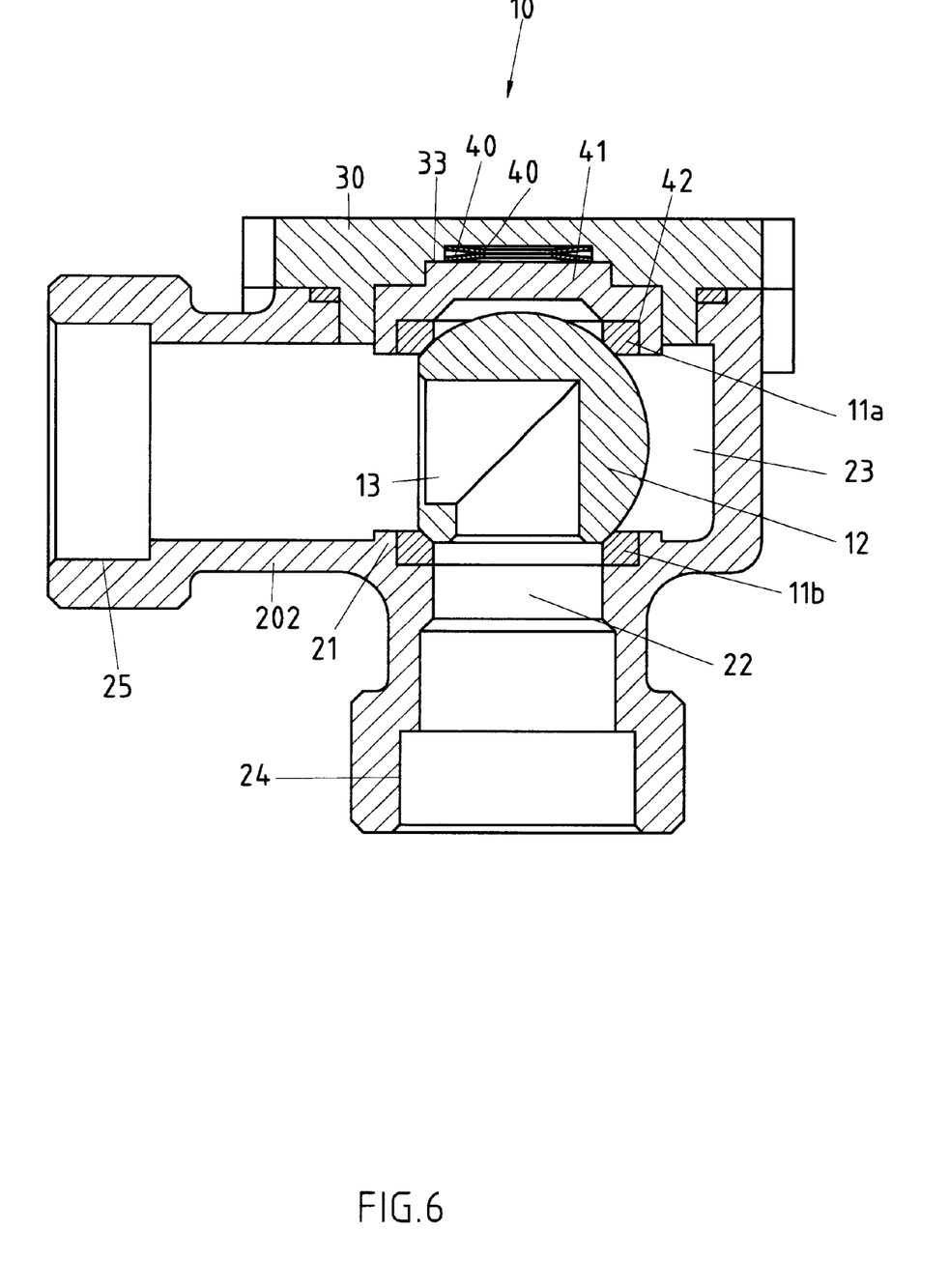
FIG. 6 shows a sectional view of the present invention having a spherical body with an L-shaped channel.

As shown in FIGS. 5 and 6, the annular rib 21 of the valve body 20 is constructed in such a manner that the annular seat 22, the first threaded pipe 24, the chamber 23, and the second threaded pipe 25 are in communication with one another. The first PTFE 11a is caused by the driven member to come in contact with the spherical body 12.

Figure 7:
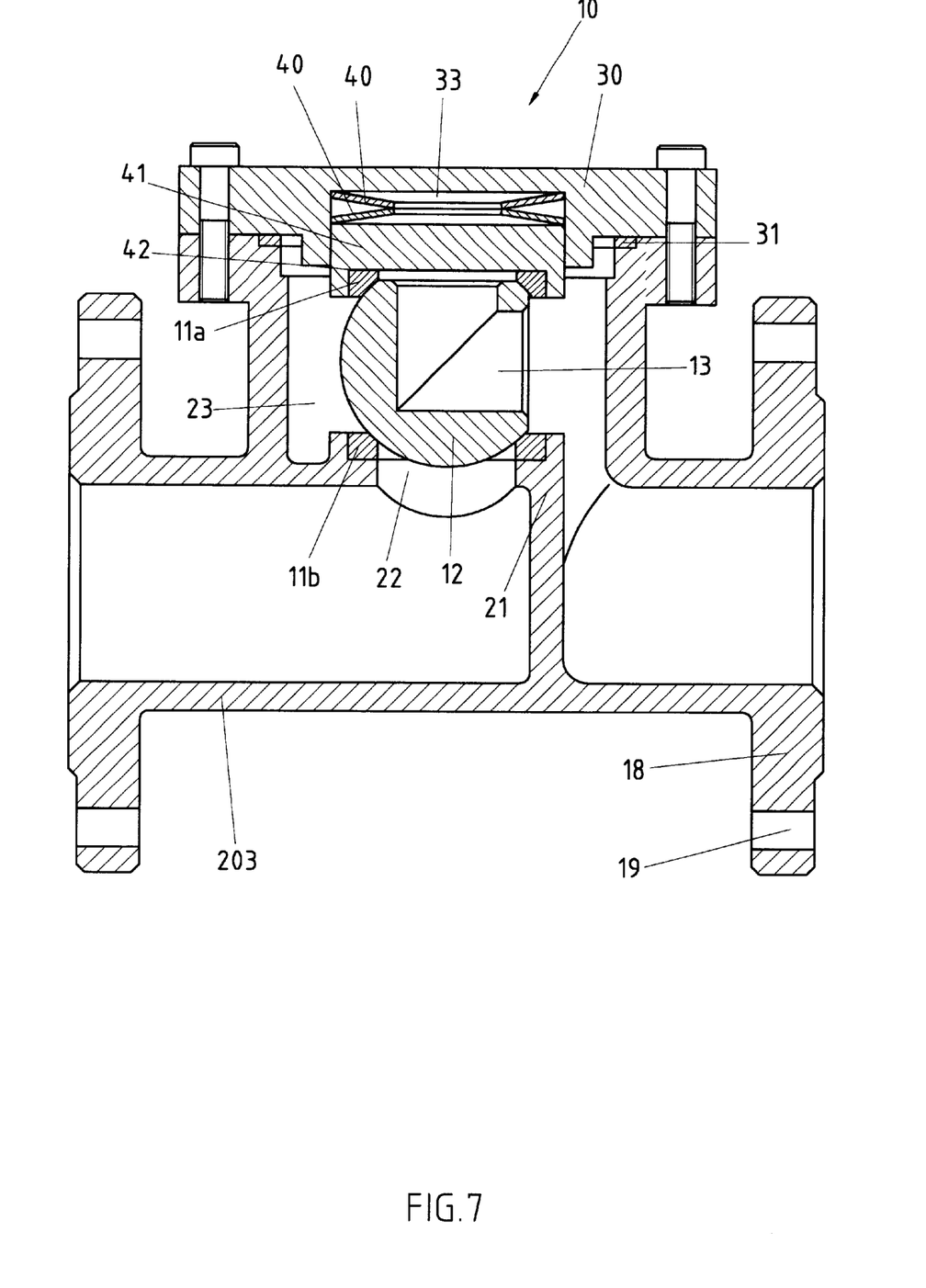
FIG. 7 shows a sectional view of the present invention having a Francis spherical body.

As shown in FIG. 7, the threaded pipes 24 and 25 are replaced by an annular plate 18 which is provided with a hole 19.

Figure 8:
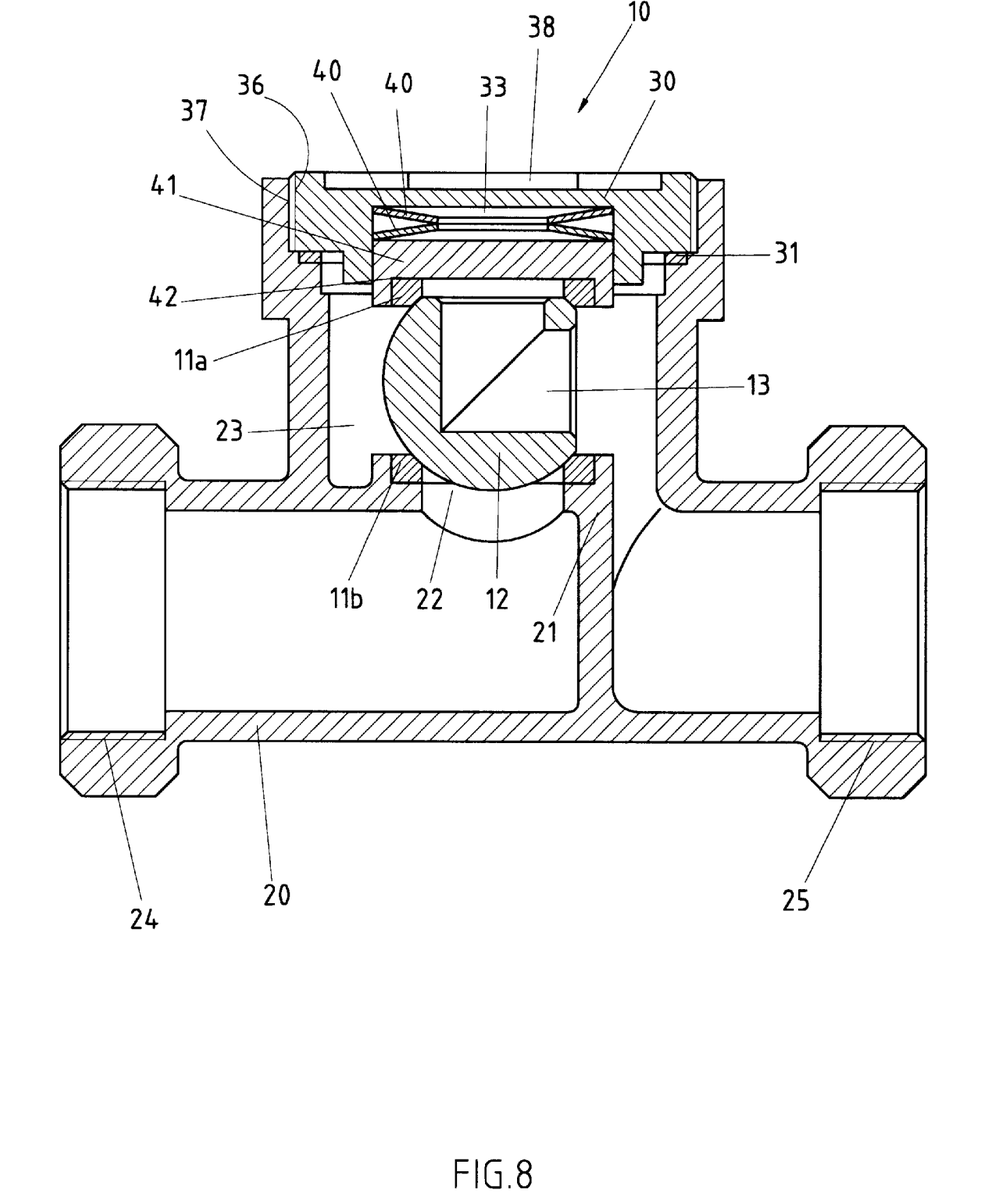
FIG. 8 shows a sectional view of the cap of the present invention.

As shown in FIG. 8, the lugs 27 of the valve body and the lugs 35 of the cap 30 are replaced by the threaded portions 36 and 37 cooperative with a drive portion 38 of the cap 30.

Figure 9:
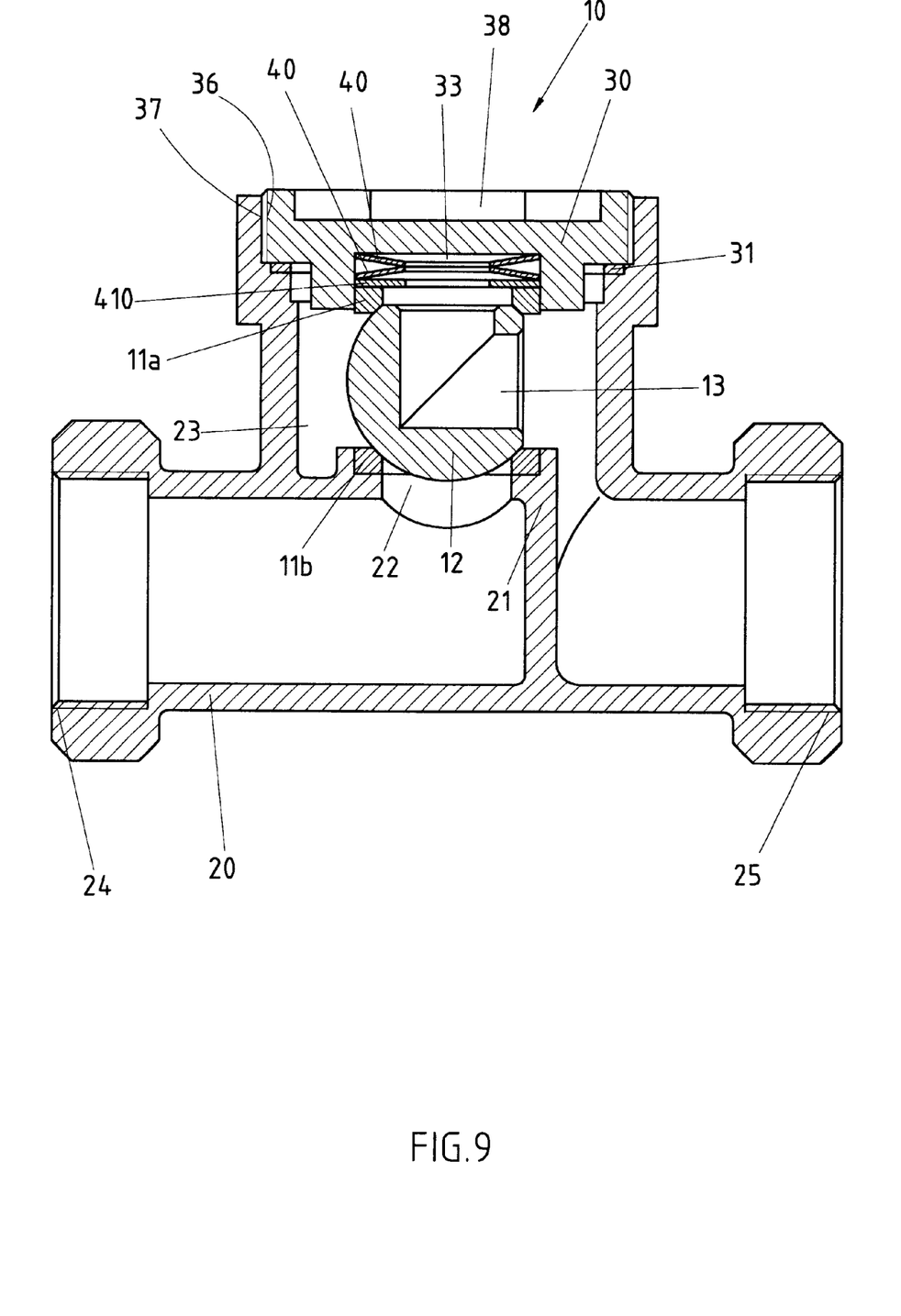
FIG. 9 shows a sectional view of the driven member of the present invention.

As shown in FIG. 9, the driven member 41 is a driven piece 410, which is disposed between the disk spring 40 and the second PTFE washer 11a.

In light of the PTFE washers 11a and 11b being pushed by the driven member 41 or the driven piece 410 which is in turn urged by the disk spring 40, the PTFE washers 11a and 11b are always in an intimate contact with the spherical body 12, thereby preventing the leak of the ball valve 10. The disk spring 40 and the driven member 41 are independently disposed in the receiving portions 33 of the cap 30 without interfering the fluid flow of the ball valve 10.

I claim:

1. A ball valve comprising:

a valve body comprised of an interior which is divided by an annular rib into an annular seat and a chamber, said valve body comprising: at one end, a first threaded pipe extending therefrom such that said threaded pipe is in communication with said chambe via said annular seat and, at another end, a second threaded pipe in communication with said chamber, said valve body further comprising a shaft tube in communication with said chamber, a rotary shaft pivoted to said shaft tube, and a plurality of lugs;

a cap joined with said chamber in conjunction with a seal ring and comprised of a receiving portion corresponding in location to said annular seat, and a plurality of lugs corresponding in number and location to said lugs of said valve body; a disk spring disposed in said receiving portion of said cap;

a driven member disposed in said receiving portion of said cap and comprised of an annular clamp seat;

a spherical body comprised of an L-shaped channel and disposed between a first PTFE washer which is retained in said annular clamp seat, and a second PTFE washer which is retained in said annular seat of said valve body, said spherical body provided in the outer surface with a retaining slot for retaining a protrusion of said rotary shaft whereby said PTFE washers are pushed by said driven member to come in contact with said spherical body at the time when said driven member is urged by said disk spring.

2. The ball valve as defined in claim 1, wherein said driven member is comprised of a driven piece which is disposed between said disk spring and said first PTFE washer.

* * * * *